United States Patent [19]

Groenhof

[11] Patent Number: 4,577,523

[45] Date of Patent: Mar. 25, 1986

[54] SILICONE TRACTION FLUIDS

[75] Inventor: Eugene D. Groenhof, Freeland, Mich.

[73] Assignee: Dow Corning Corporation, Midland, Mich.

[21] Appl. No.: 555,757

[22] Filed: Nov. 28, 1983

[51] Int. Cl.$^4$ ............................................. F16H 15/08
[52] U.S. Cl. ..................... 74/200; 556/450; 556/455
[58] Field of Search .................. 556/455, 450; 74/200

[56] References Cited

U.S. PATENT DOCUMENTS

| | | | |
|---|---|---|---|
| 304,726 | 9/1884 | Groenhof | 19/149 |
| 3,440,894 | 4/1969 | Hammann et al. | 74/200 |
| 3,652,418 | 3/1972 | Wygant | 252/73 |
| 3,994,816 | 11/1976 | Wygant | 252/73 |
| 4,137,189 | 1/1979 | Holbrook et al. | 252/75 |
| 4,190,546 | 2/1980 | Kulik et al. | 252/49.6 |
| 4,340,495 | 7/1982 | Brown | 252/78.3 |
| 4,357,252 | 11/1982 | Huber et al. | 252/78.3 |

OTHER PUBLICATIONS

F. G. Rounds, "Effect of Lubricant Composition on Friction as Measured with Thrust Ball Bearings", *J. Chem. Engn. Data*, 5, 499 (1960).

R. L. Green et al., "Lubricants for Traction Drive", *Mach. Design*, 46, 108 (1974).

"Base Fluids" in Functional Fluids for Industry, Transportation and Aerospace, Ranney (Ed), Noyes Data Corp., Park Ridge, N.J. (1980).

*Primary Examiner*—Paul F. Shaver
*Attorney, Agent, or Firm*—Richard A. Kaba; Robert L. McKellar

[57] ABSTRACT

Polyorganosiloxane traction fluids which contain significant amounts of mono-organosiloxane units are described. Specifically, the disclosed polyorganosiloxane traction fluids contain 7 to 45 weight percent siloxane units of formula [$RSiO_{3/2}$], 40 to 90 weight percent of siloxane units of formula [$R_2SiO$], and 0 to 20 weight percent of siloxane units of formula [$(CH_3)_3SiO_{\frac{1}{2}}$] where the molar ratio of [$R_3SiO_{\frac{1}{2}}$] units to [$RSiO_{3/2}$] units is less than 1 and where R is either cyclohexyl radicals, phenyl radicals, and/or methyl radicals. The polyorganosiloxane traction fluids of this invention are particularly well suited for use in traction drive systems and transmissions subject to wide operating temperature conditions.

28 Claims, No Drawings

SILICONE TRACTION FLUIDS

BACKGROUND

This invention relates to polyorganosiloxane traction fluids. The polyorganosiloxane traction fluids of this invention are particularly well suited for use in traction drive systems and transmissions subject to wide operating temperature conditions.

A traction drive is a device by which torque can be transmitted from one smooth rolling element to another wherein the rolling elements are in nominal point or line contact. One such simple traction drive might consist of two parallel cylindrical elements in nominal line contact where one element is the input member and the other is the output member. As is well known in the art, both fixed speed and variable speed traction drives can be made by proper selection of the number, size, shape, and geometrical configuration of the roller elements. The continuously variable speed traction drive is attracting current interest for automotive applications because it has been estimated that use of such a traction drive could result in increased fuel efficiencies of 30–50% without sacrificing vehicle performance. Another advantage of traction drives over conventional transmissions is the smooth and quiet operation of the traction drive.

The limited lifetime and load carrying capabilities of traction drives have substantially prevented their widespread use except for light-duty applications. Recently, however, the development of better lubricants, called traction fluids, have allowed the development of traction drive transmissions which are suitable for heavy-duty applications. Indeed, the properties of the traction fluid, which also acts as a lubricant and coolant in the traction drive, determines to a large degree the performance, capacity, and lifetime of the traction drive. Of critical importance are the properties of the traction fluid under the high pressure and high shear conditions found in the area of contact between the roller elements. Although the roller elements are usually spoken of as being in contact, it is generally accepted that the roller elements are separated by a thin film of the tractive fluid. It is through the traction fluid's resistance to shear that the torque transmitting ability of a given fluid arises. The torque transmitting ability of a fluid, and thus its suitability as a traction fluid, is measured by and is directly related to its traction coefficient.

Hammann, et al. disclosed in U.S. Pat. No. 3,440,894 (Apr. 29, 1969) that certain classes of fluids characterized by high traction coefficient and molecular structure were superior traction fluids. Wygant in U.S. Pat. No. 3,994,816 (Nov. 30, 1976) discloses that certain hydrogenated dimers of alpha-methylstyrene (e.g. 2,4-dicyclohexyl-2-methyl pentane) are suitable as traction fluids. U.S. Pat. No. 3,994,816 is further discussed in an article entitled "Base Fluids" in *Functional Fluids for Industry, Transportation and Aerospace*, M. W. Ranney (Ed), Noyes Data Corporation, Park Ridge, N.J. (1980). Among the disclosed traction fluids were the cycloaliphatic hydrocarbon species. Preferred cycloaliphatic hydrocarbons are now offered as traction fluids by Monsanto Company under the tradename Santotrac. Although the Santotrac fluids offer high traction coefficients they have one major disadvantage which has prevented the more wide-spread utilization of traction drives. At sub-zero temperatures the viscosity of the Santotrac fluid increases dramatically. For example, one Santotrac fluid has a viscosity of 31,600 centistokes at $-20°$ F. and an estimated viscosity of 200,000 centistokes at $-40°$ F. Clearly such fluids could not be successfully used in applications subjected to low temperature extremes. One such application, for example, in which a Santotrac fluid traction drive might not be successfully employed would be vehicles exposed to sub-zero temperatures.

Several attempts have been made to develop fluids with reasonable low temperature viscosity and high traction coefficients. Wygant in U.S. Pat. No. 3,652,418 (Mar. 28, 1972) discloses that a low temperature traction fluid can be prepared by blending 30–60% by weight hydrogenated dicumyl, 30–60% by weight tercyclohexyl, and at least 5% by weight dicyclohexyl or certain alkyl dicyclohexyl. The disclosed blends of Wygant gave acceptable traction coefficients and improved low temperature viscosities as compared to U.S. Pat. No. 3,440,894 traction fluids. However, Wygant admits that his blended traction fluids gave only "operable viscosity ranges over temperatures of 0° to 210° F."

Kulik and Smith in U.S. Pat. No. 4,190,546 (Feb. 26, 1980) disclosed that a traction fluid with acceptable low temperature properties and traction coefficients could be obtained by blending a Santotrac fluid with a silicone fluid containing from 15 to 25 methyl groups per phenyl group if, and only if, about 2 to 10% by weight of an aromatic hydrocarbon or aromatic ether co-solvent is added. The co-solvent is required to ensure complete miscibility of the siloxane and Santotrac fluids.

Siloxanes have been evaluated for use as traction fluids. F. G. Rounds ("Effect of Lubricant Composition on Friction as Measured With Thrust Ball Bearings," *J. Chem. Engn. Data,* 5, 499–507 (1960)) found that several different siloxanes had traction coefficients approximately equal to that found for mineral oils. The mineral oils have traction coefficients much lower than that of cycloaliphatic hydrocarbons such as Santotrac. One siloxane, a chlorophenyl silicone, was reported by Green and Langenfeld ("Lubricants for Traction Drives," *Mach. Design,* 46, 108,113 (1974)), to have a traction coefficient approaching that found for the cycloaliphatic hydrocarbons. However, this chlorophenyl silicone was not suitable as a traction fluid because of its poor resistance to oxidation and moisture and the resulting tendency to gel.

More recently, certain siloxanes suitable for use as traction fluids were described in Groenhof, U.S. patent application Ser. No. 304,726, filed Sept. 23, 1981 which is hereby incorporated by reference. The siloxanes of Ser. No. 304,726 could be used as traction fluids either alone or in combination with cycloaliphatic hydrocarbons. The disclosed siloxane fluids contained $[(CH_3)_3SiO_{\frac{1}{2}}]$ units, $[(CH_3)R'SiO]$ units, and, optionally, $[(CH_3)_2SiO]$ units where $R'$ is a phenyl radical or a cyclohexyl radical and where there are about 1.6 to 14 methyl radicals for each $R'$ radical. The disclosed siloxane fluids may also contain a limited amount of $[RSiO_{3/2}]$ units where R is methyl, phenyl, or cyclohexyl radicals. The $[RSiO_{3/2}]$ content of the siloxanes of Ser. No. 304,726 should be kept below 5 percent by weight and preferably below 1 percent by weight. The most preferred siloxanes of Ser. No. 304,726 do not contain any $[RSiO_{3/2}]$ units.

It has now been found that siloxane fluids containing significant amount of $[RSiO_{3/2}]$ units make excellent traction fluids. It is, therefore, one object of this present invention to provide polyorganosiloxanes which contain significant amounts of [RSiO$_{3/2}$] units and which are useful as traction fluids. Another object is to provide polyorganosiloxane traction fluids suitable for use at low temperatures. Another object is to provide polyorganosiloxane traction fluids which contain only methyl radicals as the organic groups attached to silicon. Still another object of this invention is to provide improved traction drive systems particularly well suited for operating under widely varying temperature environments.

THE INVENTION

The present invention relates to a traction fluid consisting essentially of a polyorganosiloxane fluid which contains 7 to 45 weight percent siloxane units of formula [RSiO$_{3/2}$], 40 to 90 weight percent siloxane units of formula [R$_2$SiO], and 0 to 20 weight percent siloxane units of formula [(CH$_3$)$_3$SiO$_{\frac{1}{2}}$], where the molar ratio of [(CH$_3$)$_3$SiO$_{\frac{1}{2}}$] siloxane units to [RSiO$_{3/2}$] siloxane units in said polyorganosiloxane fluid is less than 1, where R is independently selected from the group consisting of methyl, cyclohexyl, and phenyl radicals, and where said polyorganosiloxane fluid has a kinematic viscosity of about 20 to 200 centistokes at 77° F.

This invention also relates to an improved traction drive system having at least two relatively rotatable members in a torque transmitting relationship and a traction fluid disposed on the tractive surfaces of said members, where the improvement comprises employing, as said traction fluid, a fluid consisting essentially of polyorganosiloxane fluid which contains 7 to 45 weight percent siloxane units of formula [RSiO$_{3/2}$], 40 to 90 weight percent siloxane units of formula [R$_2$SiO], and 0 to 20 weight percent siloxane units of formula [(CH$_3$)$_3$SiO$_{\frac{1}{2}}$], where the molar ratio of [(CH$_3$)$_3$SiO$_{\frac{1}{2}}$] siloxane units to [RSiO$_{3/2}$] siloxane units in said polyorganosiloxane fluid is less than 1, where R is independently selected from the group consisting of methyl, cyclohexyl, and phenyl radicals, and where said polyorganosiloxane fluid has a kinematic viscosity of about 20 to 200 centistokes at 77° F.

The polyorganosiloxane traction fluid of this present invention contain 7 to 45 weight percent siloxane units of general formula [RSiO$_{3/2}$], 40 to 90 weight percent siloxane units of general formula [R$_2$SiO], and 0 to 20 weight percent siloxane units of formula [(CH$_3$)$_3$SiO$_{\frac{1}{2}}$] where the molar ratio of [(CH$_3$)$_3$SiO$_{\frac{1}{2}}$] units to [RSiO$_{3/2}$] units is less than one. It is preferred, however, that the polyorganosiloxane fluid contain a minimum of about 10 weight percent [RSiO$_{3/2}$] siloxane units. More preferred polyorganosiloxane traction fluids contain 20 to 30 weight percent siloxane units of general formula [RSiO$_{3/2}$], 65 to 75 weight percent siloxane units of general formula [R$_2$SiO], and 0 to 5 weight percent siloxane units of formula [(CH$_3$)$_3$SiO$_{\frac{1}{2}}$]. R in the siloxane units [R$_2$SiO] and [RSiO$_{3/2}$] may be independently selected from the group consisting of methyl, phenyl, and cyclohexyl radials. Thus a polyorganosiloxane traction fluid may contain only one type of R radical or may contain two or three different R radicals. If the polyorganosiloxane traction fluid contains phenyl or cyclohexyl radicals it is preferred that methyl radicals are also present in the RSiO$_{3/2}$ and/or R$_2$SiO units. The most preferred traction fluids contain [RSiO$_{3/2}$], [R$_2$SiO], and [(CH$_3$)$_3$SiO$_{\frac{1}{2}}$] units where R is a methyl radical.

The polyorganosiloxanes of this invention should have a viscosity of between about 20 to 200 centistokes and preferably between 50 and 110 centistokes at 77° F. It is also preferred that the viscosity should be less than about 5000 centistokes at −40° F. in order that these traction fluids be useful when exposed to low temperatures.

The polyorganosiloxanes of this invention may be prepared by methods well known in the art. For example, these polyorganosiloxanes may be prepared by the hydrolysis of appropriate amounts of RSiCl$_3$, R$_2$SiCl$_2$, and (CH$_3$)$_3$SiCl.

The traction fluids of this invention can be employed alone or with additives such as anti-wear agents, anti-oxidation agents, anti-rust agents, anti-foam agents, etc. Such additives are well known in the art.

The polyorganosiloxane traction fluids of this invention are naturally intended for use in traction drives, traction drive systems, or traction devices by which torque is transmitted via rolling elements in nominal line or point contact. These traction fluids are especially well suited for use in such traction drives, systems, or devices subjected to temperature extremes as low as −40° F. The use of these traction fluids result in improved traction drive systems. One such traction drive system is the traction drive transmission for motor vehicles. Additionally, these traction fluids would be useful in limited slip differentials. In limited slip differentials these traction fluids could be either the original fluid or added to a worn limited slip differential. In either case the limited slip differential using these traction fluids should exhibit a longer useful lifetime.

Although the applicant does not wish to be limited by theory, it is believed that the polyorganosiloxane fluids of this invention are useful as traction fluids, at least in part, because of their cagelike or spherical molecular structure. The cagelike molecular structure of the present polyorganosiloxanes is due to the presence of significant amounts of [RSiO$_{3/2}$] siloxane units and the molar ratio of [R$_3$SiO$_{\frac{1}{2}}$] to [RSiO$_{3/2}$] siloxane units being less than 1. It is thought that the cagelike molecular structure of the traction fluids of this invention keeps the traction fluid film between the tractive surfaces thick enough during actual operation of the tractive drive so that metal-to-metal contact between the tractive surface is prevented. This appears to be especially true for the all methyl radical containing fluids. On the other hand it appears that linear polydimethylsiloxane fluids allow for metal-to-metal contact because the linear or rod-shaped molecular structure allows for a very thin film between the tractive surface during actual operation of the traction drive system. By keeping a sufficient film thickness of traction fluid between the tractive surfaces, the tractive fluids of the present invention, especially the all methyl containing polyorganosiloxane, represents a significant advance over the prior art.

The following Examples are merely illustrative and are not intended to limit the invention.

In the examples all viscosities are kinematic viscosities and are reported in centistokes.

Traction measurements were made on test equipment developed by Traction Propulsion, Inc. of Austin, Tex. The test machine consists essentially of two identical flat bearing races (standard Torrington, 3.5 inches diameter) turned by separate shafts. The shafts are parallel and 2.75 inches apart. The bearing area of the races face each other and are about 1.5 inches apart. A single 1.50 inch diameter ball (AlSl No. E-52100 steel, Rockwell hardness 62-62), mounted on a movable spindle, is positioned between and in contact with the two bearing races such that a line drawn between the two contact points will intersect the center of the ball. The two shafts carrying the bearing races are connected by timing chains so that each race turns at the same angular speed and direction during a fluid evaluation. The races are loaded against the ball, and thus indirectly against each other, by means of a hydraulic piston to give the desired mean Hertz load. The Hertz load is calculated as the applied load divided by the nominal contact area between the race and the ball. When the ball is positioned equidistant from the centers of the two rotating races, there is no sliding ("creep") in the lubricated contacts between the races and the ball because rolling speeds at both contact points are equal. By moving the ball toward the center of one of the races a difference in surface speed between the two contacts is produced giving rise to a calculated "creep". This creep (in percent) is defined as the sliding speed divided by the rolling speed, times 100.

This creep produces a tangential or traction force on the surface of the ball which is experimentally measured as the force required to maintain the ball in the required position for a desired creep value. The test lubricant is pumped through orifices directly at the two contact points between the ball and the races after first being passed through a heat exchanger to obtain the desired fluid temperature. The apparatus is thoroughly cleaned before a new test fluid is introduced. The traction coefficient of a given fluid under a given set of experimental conditions (i.e. mean Hertz load, rolling speed, creep, temperature) is determined from the equation $$f_t = \frac{\text{tangential force}}{2 \text{ (normal force)}}$$

where the tangential force is the force required to keep the ball in the required position for a given creep value and the normal force is the force applied via the piston forcing the races against the ball. The factor of 2 enters the above equation since there are two contact points.

EXAMPLE 1

A mixture of $CH_3SiCl_3$ (26.1 parts by weight), $(CH_3)_2SiCl_2$ (70.5 parts by weight), and $(CH_3)_3SiCl$ (3.4 parts by weight) was hydrolyzed in sufficient water at room temperature to yield a 36 percent aqueous HCl solution. After separating the hydrolyzate from the aqueous layer, heptane was added and the mixture washed with hot water to remove traces of acid. The hydrolyzate and heptane layers were then separated from the aqueous layer (dilute HCl) and then stripped at about 140° C. and atmospheric pressure to remove the heptane and siloxane volatiles. The stripped hydrolyzate, hereafter referred to a hydrolyzate A, contained 25.5 mole percent $[CH_3SiO_{3/2}]$ units, 70.6 mole percent $[(CH_3)_2SiO]$ units, 3.9 mole% $[(CH_3)_3SiO_{\frac{1}{2}}]$, and 0.36 weight percent OH groups. Hydrolyzate A had a specific gravity of 0.989 and a viscosity of 12.1 cs at 77° F.

The silanol groups of hydrolyzate A were encapped by reacting 2950 g of hydrolyzate A with 102 g of $(CH_3)_3SiCl$ (a 50 percent excess) at room temperature for one hour. The reaction product was washed in a large separatory funnel with, first, a quart of distilled water, followed by a quart of 5 percent aqueous sodium carbonate, and, finally, with a second quart of distilled water. The washed reaction product was stripped to a pot temperature of 160° C. (vapor temperature 120° C.) and 10 mm mercury. About 1000 g of distillate was removed. The stripped product was filtered using Hyflo Super-Cel filter aid (Manville Corporation, Denver, Colo.).

The final polyorganosiloxane fluid contained about 25 weight percent $[CH_3SiO_{3/2}]$ units, about 71 weight percent $[(CH_3)_2SiO]$ units, and about 4 weight percent $[(CH_3)_3SiO_{\frac{1}{2}}]$ units. The molar ratio of $[(CH_3)_3SiO_{\frac{1}{2}}]$ to $[CH_3SiO_{3/2}]$ units was about 0.13 and the specific gravity was 1.002.

The traction properties of this polyorganosiloxane fluid were evaluated under varying conditions. For comparison purposes Santotrac 50 was also evaluated. Santotrac 50 is a commercial cycloaliphatic hydrocarbon traction fluid available from Monsanto Company, St. Louis, Mo. The viscosity of the polyorganosiloxane fluid and Santotrac 50 were evaluated at various temperatures.

| Temperature (°F.) | Viscosity (CS) | |
|---|---|---|
| | Polyorganosiloxane | Santotrac 50 |
| 210 | 12.3 | 5.6 |
| 77 | 55 | 75 |
| 0 | 244 | 5120 |
| −20 | 456 | 41,500 |
| −40 | 975 | "solid" |

The traction coefficients were determined at 35 ft/sec, 140°–160° F., and 1.42 percent creep.

| Mean Hertz Contact Pressure (KPSI) | Traction Coefficient | |
|---|---|---|
| | Polyorganosiloxane | Santotrac 50 |
| 150 | 0.086 | 0.093 |
| 200 | 0.086 | 0.091 |

The traction coefficients were also determined as a function of the fluid temperature at a speed of 35 ft/sec, 200 KPSI mean Hertz contact pressure, and a 1.42 percent creep value.

| Temperature (°F.) | Traction Coefficient | |
|---|---|---|
| | Polyorganosiloxane | Santotrac 50 |
| 65–70 | 0.081 | 0.099 |
| 120–130 | — | 0.091 |
| 150–155 | — | 0.083 |
| 160–170 | 0.086 | 0.081 |
| 195 | 0.085 | — |

As the temperature was raised from about 65° to 160° F. the traction coefficient of Santotrac 50 decreased about 18 percent whereas the traction coefficient of the polyorganosiloxane fluid increased about 6 percent.

EXAMPLE 2

A polyorganosiloxane fluid was prepared by stripping hydrolyzate A prepared in Example 1. The hydrolyzate A was stripped in a Rototherm Thin Film Stripper at 250°–300° C. at a pressure of 20–30 mm mercury. After stripping the fluid was filtered using the Hyflo Super-Cel filter aid. The final polyorganosiloxane fluid contained about 25 weight percent $[CH_3SiO_{3/2}]$ units, 71 weight percent $[(CH_3)_2SiO]$ units, and 4 weight percent $[(CH_3)_3SiO_{\frac{1}{2}}]$ units. A value of about 0.13 is calculated for the molar ratio of $[(CH_3)_3SiO_{\frac{1}{2}}]$ to $[CH_3SiO_{3/2}]$ units. The specific gravity was 1.035 and the OH content was 0.37 weight percent. The viscosity of the final product was 21 cS at 210° F.; 103 cS at 77° F.; 511 cS at 0° F.; 1116 cS at −20° F.; and 2470 cS at −40° F. Traction coefficients were determined at 140°–160–°F., 1.42 percent creep, and varying rolling speeds. Comparative data for Santotrac 50 is also given.

| Mean Hertz Contact Pressure (KPSI) | Rolling Speed (ft/sec) | Traction Coefficient | |
|---|---|---|---|
| | | Polyorganosiloxane | Santotrac 50 |
| 150 | 15 | 0.077 | 0.095 |
| 150 | 35 | 0.079 | 0.093 |
| 150 | 65 | 0.067 | 0.086 |
| 150 | 100 | 0.058 | 0.077 |
| 200 | 15 | 0.085 | 0.087 |
| 200 | 35 | 0.083 | 0.091 |
| 200 | 65 | 0.072 | 0.085 |
| 200 | 100 | 0.066 | 0.079 |
| 250 | 35 | 0.088 | 0.083 |

EXAMPLE 3

A mixture of $CH_3SiCl_3$ (135 g) and $(CH_3)_2SiCl_2$ (1950 g) were hydrolyzed at room temperature in a continuous hydrolysis reactor using sufficient water to yield a 30% aqueous HCl solution. The contact time was about 5 minutes. The hydrolyzate was washed several times with distilled water. The hydrolyzate contained about 92 weight percent $[(CH_3)_2SiO]$ siloxane units, about 8 weight percent $[CH_3SiO_{3/2}]$ units, and about 0.7 weight percent OH groups. The silanol groups were endcapped by stirring the hydrolyzate with 70 g $(CH_3)_3SiCl$ for about 45 minutes. After washing with five 250 ml portions of distilled water, the polyorganosiloxane fluid was dried over sodium sulfate and then filtered. The polyorganosiloxane fluid was then stripped at a pot temperature of 180° C. and a pressure of about 10 mm mercury. The stripped fluid had a viscosity of 34 cS at 77° F. Based on the amount of OH groups present in the hydrolyzate and assuming all are endcapped, it is estimated that the final product contains about 89 weight percent $[(CH_3)_2SiO]$ units, about 8 weight percent $[CH_3SiO_{3/2}]$ units, and about 3 weight percent $[(CH_3)_3SiO_{\frac{1}{2}}]$ units. A value of about 0.30 is estimated for the molar ratio of $[(CH_3)_3SiO_{\frac{1}{2}}]$ to $[CH_3SiO_{3/2}]$ units. Traction coefficients were determined at about 140° F. and a creep of 1.42%.

| Mean Hertz Contact Pressure (KPSI) | Rolling Speed (ft/sec) | Traction Coefficient |
|---|---|---|
| 150 | 15 | 0.067 |
| 150 | 35 | 0.063 |
| 150 | 65 | 0.058 |
| 150 | 100 | 0.057 |
| 200 | 15 | 0.081 |
| 200 | 35 | 0.078 |
| 200 | 65 | 0.065 |
| 200 | 100 | 0.066 |
| 250 | 15 | 0.088 |
| 250 | 35 | 0.081 |
| 250 | 65 | 0.080 |
| 250 | 100 | 0.065 |

EXAMPLE 4

Using the same procedure as in Example 3, $CH_3SiCl_3$ (890 g), $(CH_3)_2SiCl_2$ (1107 g), and $(CH_3)_3SiCl$ (222 g) were reacted to form a hydrolyzate containing about 33 weight percent $[CH_3SiO_{3/2}]$ units, 53 weight percent $[(CH_3)_2SiO]$ units, and 14 weight percent $[(CH_3)_3SiO_{\frac{1}{2}}]$ units. The molar ratio of $[(CH_3)_3SiO_{\frac{1}{2}}]$ to $[CH_3SiO_{3/2}]$ units was about 0.34. The silanol groups in the hydrolyzate were endcapped by reacting with about 100 g of $(CH_3)_3SiCl$ as in Example 3. The final, stripped product had a viscosity of 60 cS at 77° F. Traction coefficients were determined at 140°–160° F. and a creep of 1.42%.

| Mean Hertz Contact Pressure (KPSI) | Rolling Speed (ft/sec) | Traction Coefficient |
|---|---|---|
| 150 | 15 | 0.072 |
| 150 | 35 | 0.072 |
| 150 | 65 | 0.066 |
| 150 | 100 | 0.060 |
| 200 | 15 | 0.086 |
| 200 | 35 | 0.083 |
| 200 | 65 | 0.070 |
| 200 | 100 | 0.070 |
| 250 | 15 | 0.090 |
| 250 | 35 | 0.080 |
| 250 | 65 | 0.072 |
| 250 | 100 | 0.066 |

EXAMPLE 5

A $[(CH_3)_2SiO][C_6H_5SiO_{3/2}]$ copolymer (1800 g), hexamethyldisiloxane (882 g) and 1800 g of 20 percent aqueous HCl were stirred at room temperature for 17 hours. The $[(CH_3)_2SiO][C_6H_5SiO_{3/2}]$ copolymer contained about 64 mole percent $(CH_3)_2SiO$ units and 33 mole percent $[C_6H_5SiO_{3/2}]$ units, and had a viscosity of about 13 cS at 77° F. After stirring the reaction mixture was separated into an aqueous layer and a siloxane layer. The siloxane layer was stirred with an additional 1800 g of a 15 percent aqueous HCl solution for 4 hours at room temperature. The siloxane layer was washed with a 5 percent aqueous sodium bicarbonate solution and then twice with distilled water. The washed hydrolyzate was stripped at a pot temperature of 160° C. (vapor temperature of 82° C.) and a pressure of 10 mm mercury. The stripped product was recovered in an 82 percent yield. After filtration, the product had a viscosity of about 40 cS at 77° F. and an OH content of 0.3 weight percent.

The stripped and filtered product (1686 g) was stirred with 48 g of $(CH_3)_3SiCl$ for one hour at room temperature to endcap the silanol groups. Heptane (500 ml) was added and the non-aqueous layer was collected. The non-aqueous product layer was washed with 5 percent aqueous sodium bicarbonate and then with water. The polyorganosiloxane was stripped again at a 160° C. pot temperature and a pressure of 10 mm mercury to give the final product. The final product contained 19.3 weight percent $[(CH_3)_3SiO_{\frac{1}{2}}]$ units, 43.1 weight percent $[(CH_3)_2SiO]$ units, 37.6 weight percent $[C_6H_5SiO_{3/2}]$ units, and 0.02 weight percent OH groups. A value of 0.82 was calculated for the molar ratio of $[(CH_3)_3SiO_{\frac{1}{2}}]$ units to $[C_6H_5SiO_{3/2}]$ units. The final polyorganosiloxane had a viscosity of 8.3 cS at 210° F., 42 cs at 77° F., 257 cS at 0° F., 557 cS at −20° F., and 1448 cS at −40° F.

Traction coefficients were determined at 140°–160° F. and a 1.42 percent creep value.

| Mean Hertz Contact Pressure (KPSI) | Rolling Speed (ft/sec) | Traction Coefficient |
| --- | --- | --- |
| 150 | 15 | 0.067 |
| 150 | 35 | 0.083 |
| 150 | 65 | 0.055 |
| 150 | 100 | 0.058 |
| 200 | 15 | 0.075 |
| 200 | 35 | 0.071 |
| 200 | 65 | 0.061 |
| 200 | 100 | 0.057 |
| 250 | 15 | 0.077 |
| 250 | 35 | 0.070 |
| 250 | 65 | 0.064 |

EXAMPLE 6

Hydrolyzate A (15,300 g), as prepared in Example 1, was endcapped with 600 g of $(CH_3)_3SiCl$. The endcapping procedure used was as described in Example 1. The polyorganosiloxane fluid contained about 25 weight percent $CH_3SiO_{3/2}$ units, about 70 weight percent of $(CH_3)_2SiO$ units, and about 5 weight percent of $(CH_3)_3SiO_{\frac{1}{2}}$ units. A value of 0.17 was calculated for the molar ratio of $[(CH_3)_3SiO_{\frac{1}{2}}]$ units to $[CH_3SiO_{3/2}]$ units. A traction fluid blend was prepared containing the following ingredients (parts by weight):

| polyorganosiloxane | 93.78 |
| --- | --- |
| di-2-ethylhexylchlorendate | 5.65 |
| Vanlube SS | 0.25 |
| Vanlube PC | 0.24 |
| dodecenylsuccinic anhydride | 0.09 |
| Krytox 143AC | 20 ppm |

The di-2-ethylhexylchlorendate, available from Velsicol Chemical Corporation, Chicago, Ill., is an antiwear additive. Vanlube SS and Vanlube PC are oxidation inhibitors available from R. T. Vanderbilt Company, Norwalk, Conn. The dodecenylsuccinic anhydride is added as a rust inhibitor and is available from Humphrey Chemical Company, North Haven, Conn. Krytox 143AC, a defoamer, is available from E. I. DuPont deNemours and Company, Wilmington, Del.

The blended traction fluid had a specific gravity of 1.030 and an open cup flash point of about 375° F. The viscosity was determined as a function of temperature.

| Temperature (°F.) | Viscosity (cS) |
| --- | --- |
| 210 | 13 |
| 100 | 44 |
| 77 | 64 |
| 0 | 350 |
| −20 | 710 |
| −40 | 1800 |

The traction coefficients were determined at a speed of 35 ft/sec and a creep of 1.42 percent.

| Mean Hertz Contact Pressure (KPSI) | Traction Coefficient | |
| --- | --- | --- |
| | 50° F. | 223° F. |
| 150 | 0.109 | 0.076 |
| 200 | 0.119 | 0.082 |

COMPARATIVE EXAMPLE

An attempt was made to employ a trimethylsiloxy endblocked dimethylsiloxane fluid (viscosity of 100 cS at room temperature) as a traction fluid. When traction coefficients were determined at low rolling speeds (less than 35 ft/sec), values of 0.06 to 0.08 were found. When the speed was increased, however, traction coefficients could not be determined because the test equipment would begin to vibrate violently. Such violent vibrations are due to the linear dimethylsiloxane fluid employed rather than a malfunction of the test equipment since switching to other fluids at high speeds resulted in normal operation. The linear dimethylsiloxane, when retested after normal operation, again produce violent vibrations at high speeds. Such behavior strongly suggests metal-to-metal contact between the tractive surfaces at the higher speeds. In fact, the traction coefficients at speeds of 35 ft/sec or less may have a contribution from a metal-to-metal contact factor. If this is the case the traction coefficient due solely to the linear siloxane fluid may be significantly lower.

That which is claimed is:

1. In a traction drive system having at least two relatively rotatable members in a torque transmitting relationship and a traction fluid disposed on the tractive surfaces of said members, the improvement comprising employing, as said traction fluid, a fluid consisting essentially of a polyorganosiloxane fluid which contains 7 to 45 weight percent siloxane units of formula $[RSiO_{3/2}]$, 40 to 90 weight percent siloxane units of formula $[R_2SiO]$, and 0 to 20 weight percent siloxane units of formula $[(CH_3)_3SiO_{\frac{1}{2}}]$, where the molar ratio of $[(CH_3)_3SiO_{\frac{1}{2}}]$ siloxane units to $[RSiO_{3/2}]$ siloxane units in said polyorganosiloxane fluid is less than 1, where R is independently selected from the group consisting of methyl, cyclohexyl, and phenyl radicals, and where said polyorganosiloxane fluid has a kinematic viscosity of about 20 to 200 centistokes at 77° F.

2. A traction drive system as defined in claim 1 wherein said polyorganosiloxane fluid contains 20 to 30 weight percent siloxane units of formula $[RSiO_{3/2}]$, 65 to 75 weight percent siloxane units of formula $[R_2SiO]$, and 0 to 5 weight percent siloxane units of formula $[(CH_3)_3SiO_{\frac{1}{2}}]$.

3. A traction drive system as defined in claim 1 wherein R is a methyl radical.

4. A traction drive system as defined in claim 2 wherein R is a methyl radical.

5. A traction drive system as defined in claim 1 wherein R is independently selected from the group consisting of methyl radicals and cyclohexyl radicals.

6. A traction drive system as defined in claim 1 wherein R is independently selected from the group consisting of methyl radicals and phenyl radicals.

7. A traction drive system as defined in claim 1 wherein the molar ratio of $[(CH_3)_3SiO_{\frac{1}{2}}]$ siloxane units to $[RSiO_{3/2}]$ siloxane units in said polyorganosiloxane fluid is from about 0.1 to 0.2.

8. A traction drive system as defined in claim 2 wherein the molar ratio of $[(CH_3)_3SiO_{\frac{1}{2}}]$ siloxane units to $[RSiO_{3/2}]$ siloxane units in said polyorganosiloxane fluid is from about 0.1 to 0.2.

9. A traction drive system as defined in claim 3 wherein the molar ratio of $[(CH_3)_3SiO_{\frac{1}{2}}]$ siloxane units to $[RSiO_{3/2}]$ siloxane units in said polyorganosiloxane fluid is from about 0.1 to 0.2.

10. A traction drive system as defined in claim 4 wherein the molar ratio of [(CH$_3$)$_3$SiO$_{1/2}$] siloxane units to [RSiO$_{3/2}$] siloxane units in said polyorganosiloxane fluid is from about 0.1 to 0.2.

11. A traction drive system as defined in claim 3 wherein said polyorganosiloxane fluid has a kinematic viscosity of about 50 to 110 centistokes at 77° F.

12. A traction drive system as defined in claim 4 wherein said polyorganosiloxane fluid has a kinematic viscosity of about 50 to 110 centistokes at 77° F.

13. A traction drive system as defined in claim 1 wherein said traction drive system is a traction drive transmission.

14. A traction drive system as defined in claim 2 wherein said traction drive system is a traction drive transmission.

15. A traction drive system as defined in claim 3 wherein said traction drive system is a traction drive transmission.

16. A traction drive system as defined in claim 4 wherein said traction drive system is a traction drive transmission.

17. A traction drive system which comprises (a) at least two relatively rotatable members in a torque-transmitting relationship; and (b) a traction fluid disposed on the tractive surfaces of said members, said traction fluid consisting essentially of a polyorganosiloxane fluid which contains 7 to 45 weight percent siloxane units of formula [RSiO$_{3/2}$], 40 to 90 weight percent siloxane units of formula [R$_2$SiO], and 0 to 20 weight percent siloxane units of formula [(CH$_3$)$_3$SiO$_{1/2}$], where the molar ratio of [(CH$_3$)$_3$SiO$_{1/2}$] siloxane units to [RSiO$_{3/2}$] siloxane units in said polyorganosiloxane fluid is less than 1, when R is independently selected from the group consisting of methyl, cyclohexyl, and phenyl radicals, and where said polyorganosiloxane fluid has a kinematic viscosity of about 20 to 200 centistokes at 77° F.

18. A traction drive system as defined in claim 17 wherein said polyorganosiloxane fluid contains 20 to 30 weight percent siloxane units of formula [RSiO$_{3/2}$], 65 to 75 weight percent siloxane units of formula [R$_2$SiO], and 0 to 5 weight percent siloxane units of formula [(CH$_3$)$_3$SiO$_{1/2}$].

19. A traction drive system as defined in claim 17 wherein R is a methyl radical.

20. A traction drive system as defined in claim 18 wherein R is a methyl radical.

21. A traction drive system as defined in claim 17 wherein R is independently selected from the group consisting of methyl radicals and cyclohexyl radicals.

22. A traction drive system as defined in claim 17 wherein R is independently selected from the group consisting of methyl radicals and phenyl radicals.

23. A traction drive system as defined in claim 17 wherein the molar ratio of [(CH$_3$)$_3$SiO$_{1/2}$] siloxane units to [RSiO$_{3/2}$] siloxane units in said polyorganosiloxane fluid is about 0.1 to 0.2.

24. A traction drive system as defined in claim 18 wherein the molar ratio of [(CH$_3$)$_3$SiO$_{1/2}$] siloxane units to [RSiO$_{3/2}$] siloxane units in said polyorganosiloxane fluid is about 0.1 to 0.2.

25. A traction drive system as defined in claim 19 wherein the molar ratio of [(CH$_3$)$_3$SiO$_{1/2}$] siloxane units to [RSiO$_{3/2}$] siloxane units in said polyorganosiloxane fluid is about 0.1 to 0.2.

26. A traction drive system as defined in claim 20 wherein the molar ratio of [(CH$_3$)$_3$SiO$_{1/2}$] siloxane units to [RSiO$_{3/2}$] siloxane units in said polyorganosiloxane fluid is about 0.1 to 0.2.

27. A traction drive system as defined in claim 19 wherein said polyorganosiloxane fluid has a kinematic viscosity of about 50 to 110 centistokes at 77° F.

28. A traction drive system as defined in claim 20 wherein said polyorganosiloxane fluid has a kinematic viscosity of about 50 to 110 centistokes at 77° F.

* * * * *